United States Patent [19]

Adams et al.

[11] 4,255,015

[45] Mar. 10, 1981

[54] MEANS FOR COUPLING A FIBER OPTIC CABLE WITH AN ELECTRO-OPTIC TRANSDUCER

[75] Inventors: Washington Adams, Richardson; Kenneth J. Miller, Plano, both of Tex.

[73] Assignee: Rockwell International Corporation, El Segundo, Calif.

[21] Appl. No.: 939,013

[22] Filed: Sep. 1, 1978

[51] Int. Cl.³ .............................................. G02B 5/14
[52] U.S. Cl. .................................................. 350/96.20
[58] Field of Search ............... 350/96.20, 96.21, 96.22

[56] References Cited

U.S. PATENT DOCUMENTS

| | | | |
|---|---|---|---|
| 3,871,744 | 3/1975 | Bridger et al. | 350/96.21 |
| 4,075,477 | 2/1978 | Hanson | 350/96.20 |
| 4,076,376 | 2/1978 | Slaughter | 350/96.21 |
| 4,081,208 | 3/1978 | Meade | 350/96.20 |

OTHER PUBLICATIONS

E. L. Millet, "Connector Mount for Fiber Optic Bundle", *IBM Technical Disc. Bulletin*, vol. 14, No. 3, Aug. 1971.

*Primary Examiner*—Stewart J. Levy
*Attorney, Agent, or Firm*—Howard R. Greenberg; H. Fredrick Hamann

[57] ABSTRACT

A fiber optic cable is coupled with an electro-optic transducer through a ferrule which terminates the cable that is inserted in a passageway of a housing which is mounted on a planar surface so that the passageway is transverse thereto. A cover placed over the housing and latched thereto isolates the ferrule from dust and external light and insures its proper alignment with the electro-optic element, which is inserted in the passageway from the opposite end via an opening in the planar surface, by exerting a spring force on a flange of the ferrule which is a greater distance from the end of the ferrule than the distance between the passageway entrance to the ferrule and the electro-optic transducer when positioned in the passageway so that the fiber optic cable and transducer abut one another upon placement in the passageway to effect an efficacious coupling.

4 Claims, 2 Drawing Figures

MEANS FOR COUPLING A FIBER OPTIC CABLE WITH AN ELECTRO-OPTIC TRANSDUCER

BACKGROUND OF THE INVENTION

The present invention pertains generally to fiber optic communications and specifically to a means for coupling a fiber optic cable with an electro-optic transducer.

The young but rapidly evolving field of fiber optic communictions and the numerous applications therefor are creating a need for innovative solutions to mundane problems. For example, the present conventional method for coupling a fiber optic cable with an electro-optic transducer such as a light emitting diode is through the use of male/female threaded fasteners which insure the proper alignment therebetween for developing a viable electrical signal. Aside from the exposure of these coupling units, their size and/or rigid configuration render them unsuitable when a fiber optic cable has to be guided through a serpentine path to get the end of the cable to its ultimate destination. Expository of the problem is a copending patent application having the same assignee as the instant application entitled "Optical Meter Rotor Rotation Sensor" which describes the use of fiber optic cables for monitoring the number of rotations of a watthour meter and consequently the electrical consumption represented thereby to develop an electrical signal remote from the meter with minimal modification to the meter housing.

With the foregoing in mind, it is a primary object of the present invention to provide a new and improved means for coupling a fiber optic cable with an electro-optic transducer.

It is a further object of the present invention to provide such a new and improved coupling means that is inexpensive in design, yet affords proper alignment and isolation of dust and extrinsic light.

It is still a further object of the present invention to provide such a new and improved coupling means which is sufficiently resilient to permit a fiber optic cable to be snaked through a circuitous path to its intended destination.

The foregoing objects, as well as others, and the means by which they are achieved through the present invention may best be appreciated by referring to the Detailed Description of the Invention which follows hereinafter together with the appended drawing in which FIG. 1 is an isometric view of the unassembled elements of the coupling means juxtaposed with one another just prior to assembly and FIG. 2 is a sectional view along line 2—2 with the elements assembled.

BRIEF DESCRIPTION OF THE INVENTION

In accordance with the foregoing objects, the present invention is directed to a means for coupling a fiber optic cable with an electro-optic transducer through a ferrule which terminates the cable which is intended to be inserted in a passageway of a housing mounted on a planar surface such as a printed circuit board with the passageway being transverse to the surface when the housing is mounted thereon. The electro-optic transducer is inserted into the passageway through the opposite end of the passageway via an opening in the planar element after which it is affixed in place through any suitable means such as applying an adhesive epoxy to the opening. Dust and extrinsic light are isolated from the ferrule and its alignment with the transducer is ensured through a cover which fits over the housing through a latching means provided by an interior lip which engages a groove in the housing. Alignment is effectuated through an interior ridge which circumscribes the cover passageway that exerts a spring force on a flange of the ferrule which is a greater distance from the end of the ferrule than the distance between the passageway entrance to the ferrule and the electro-optic transducer when positioned in the passageway so that the end of the ferrule where the cable terminates abuts the electro-optic transducer upon placement in the passageway of the housing to produce an efficacious coupling.

In the preferred embodiment the cover is made as a rubber boot to afford resiliency and inexpensive construction. In this embodiment light and dust are precluded from entering the covered region even through the passageway that accomodates the cable by the bellows action of the ridge that closes over the ever-so-slight opening therebetween when the cover is slipped over the housing.

DETAILED DESCRIPTION OF THE INVENTION

Figure 1:
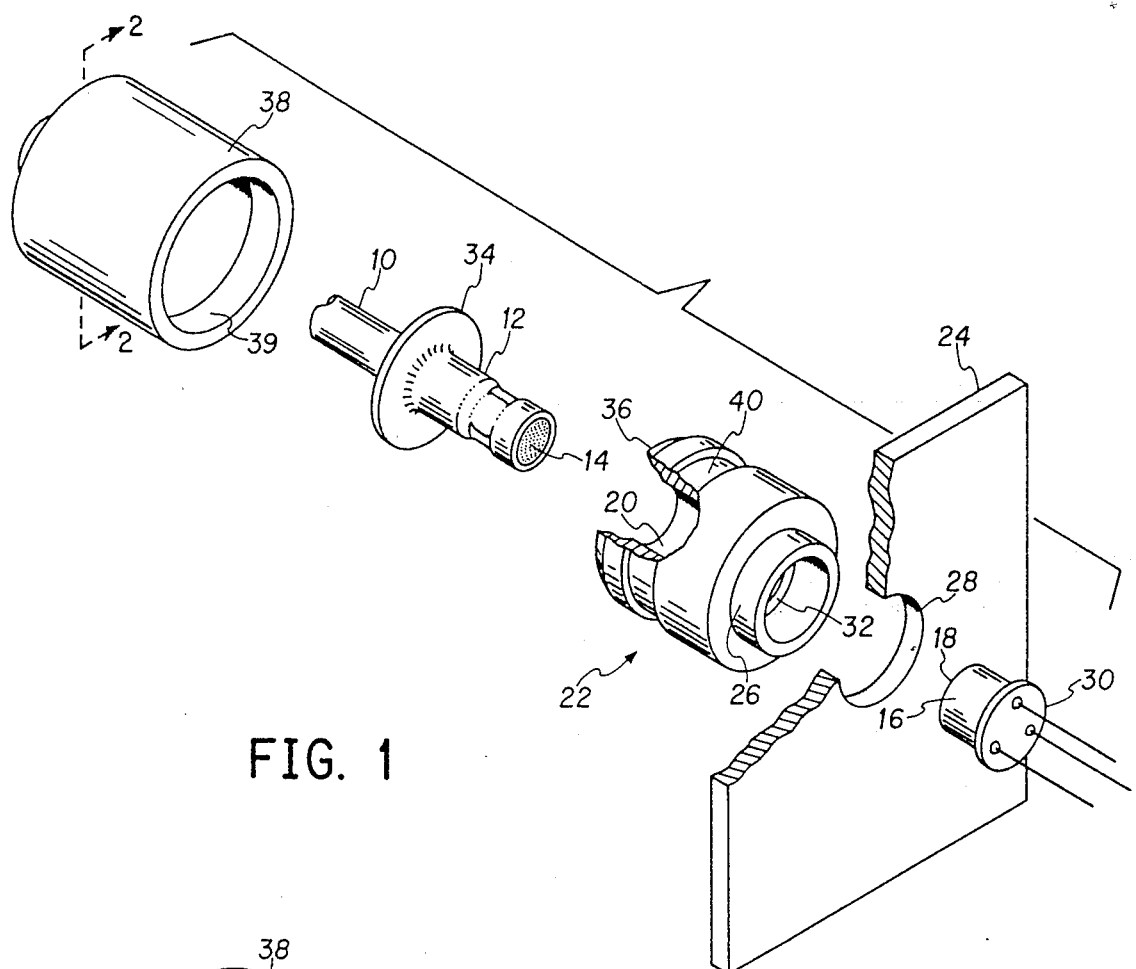
Figure 2:
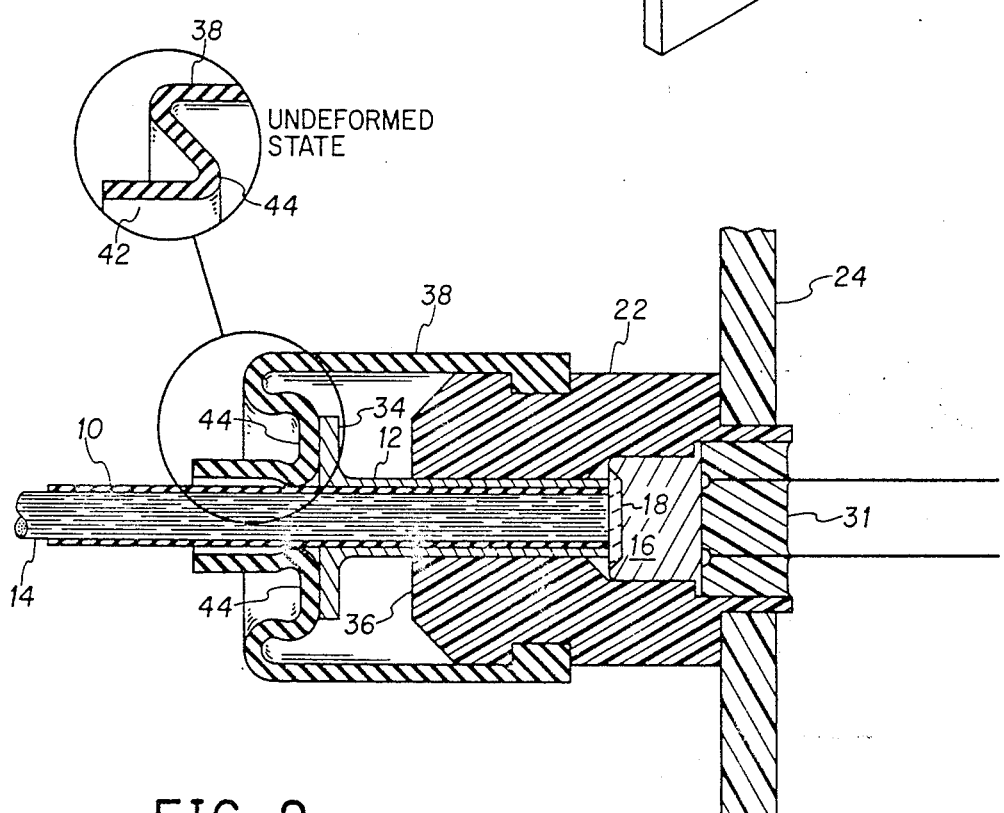

As shown in FIGS. 1 and 2, wherein the same elements are denoted with the same reference numerals, a fiber optic cable 10 is terminated with a ferrule 12 that is crimped thereon. The end of the fiber optic bundle 14 of the cable 10 coincides with the end of the ferrule 12 to provide the light which is to be transduced to an electrical signal by an electro-optic transducer such as light emitting diode 16 via a lens 18 on the top thereof.

The fiber optic cable 10 is coupled with the transducer 16 by properly aligning the ferrule 12 with the transducer lens 18 through a passageway 20 of a housing 22 which is mounted on a planar element such as printed circuit board 24 provided for assembling the electrical components including transducer 16 that comprise the desired electrical circuit. Housing 22 may be mounted to board 24 through any appropriate means such as staking the shoulder 26 thereof. The transducer 16 is positioned in passageway 20 by inserting it therein via an opening 28 in the board 24 until its movement is impeded by contact of its rim 30 against shoulder 32 of the passageway 20. Thereafter the transducer 16 may be held in place through any suitable means such as epoxy adhesive 31 placed in the opening 28 of the board 24 and entranceway to passageway 20. The proper juxtaposition of the ferrule 12 with the transducer 16 so that the light produced at the end of the fiber optic bundle 14 properly impinges on the transducer lens 18 is achieved through a flange 34 of ferrule 12 whose distance from the end of the ferrule 12 coincident with the cable 10 termination is greater than the length of the passageway 20 between the top 36 of housing 22 where the ferrule 12 enters the passageway 20 to the lens 18 of transducer 16 when positioned therein. Consequently, when the ferrule 12 is inserted in the passageway 20 via the top 36 of housing 22 its end abuts the transducer 16 to ensure the development of a viable electrical signal from the light passed therebetween.

Dust and light, which would otherwise interfere with the light reception by transducer 16 so as to degrade the electrical signal produced therefrom, are precluded from entering the passageway 20 through a cover 38 which fits over housing 22 and is latched therewith via an interior lip 39 which engages a groove 40 around the periphery of housing 22. A passageway 42 of cover 38 is provided for the fiber optic cable 10 so that when the cover 38 is placed over the housing 22 the ferrule 12 is totally enclosed therein. A ridge 44 which circumscribes the passageway 42 is designed so that it impinges on the shoulder 34 of ferrule 12 when the cover 38 is placed onto the housing 22 so as to develop a spring force against the flange 34 to maintain the abutment and alignment of ferrule 12 with electro-optic transducer 16. Although the cover 38 could be made of some light weight resilient plastic it has been found preferable to employ a rubber boot of some elastomeric material so that it is pliant which not only reduces the fabrication cost but also ensures the exclusion of dust and light without the need for a grommet which would have to be placed in the entrance of the passageway 42 to close up the space between the passageway 42 and the fiber optic cable 10. It will be readily seen that this is naturally provided for through the bellows action of the ridge 44 whereby the engagement of the latching lip 39 with the latching groove 40 and the impingement of the ridge 44 on shoulder 34 through the use of proper dimensions will cause the rubber material of the cover 38 to bulge in and up in the vicinity of ridge 44 from its undeformed state as shown by the auxiliary encircled view thereby closing up the clearance between the fiber optic cable and the passageway 42. Furthermore, the use of a rubber boot for the cover 38 affords a resilient member which can facilely be snaked through a serpentine path together with the fiber optic cable 10 when necessary to get the end of the cable to its intended final destination. As a rubber boot, cover 38 is easily emplaced on housing 22 by first turning the boot inside out and then merely wrapping it over the housing 22 so that the interior lip 39 engages groove 40.

As the foregoing demonstrates, the invention herein provides an inexpensive, albeit efficacious means, for coupling a fiber optic cable with an electro-optic transducer. Since undoubtedly modifications to the detailed description can be made by those skilled in the art without departing from the scope and spirit of the invention, the foregoing is intended to be merely exemplary and not circumscriptive of the invention as it will now be claimed hereinbelow.

What is claimed is:

1. Means for coupling a fiber optic cable with an electro-optic transducer, comprising:
   a ferrule for terminating the cable, said ferrule having a flange a predetermined distance from the end thereof which end coincides with the end of the cable;
   a housing for mounting on a planar surface, said housing having a passageway therethrough transverse to the surface when mounted to accommodate the insertion therein of the ferrule from one end and the electro-optic transducer via an opening in the surface from the opposite end, the length of the passageway being such that the distance between the passageway entrance to said ferrule and the electro-optic transducer when positioned in said passageway is less than said predetermined distance so that said flange cannot contact said housing upon insertion of said ferrule;
   a cover for mounting over said housing, having a passageway to accommodate the cable and integral means formed in the interior thereof for exerting a spring force on said flange when mounted, and
   latching means provided on said housing and cover to maintain their union upon mounting.

2. The coupling means of claim 1 wherein said interior means is provided by a ridge which circumscribes the passageway of said cover.

3. The coupling means of claims 1 or 2 wherein said latching means consists of a groove about the periphery of said housing and a lip on the interior end of said cover for engaging the groove by spring action.

4. The coupling means of claim 3 wherein said cover is a rubber boot.

* * * * *